United States Patent [19]

Douglas

[11] 4,240,706
[45] Dec. 23, 1980

[54] OPTICAL PROBE

[75] Inventor: Joseph Douglas, Belper, England

[73] Assignee: Rolls-Royce Limited, London, England

[21] Appl. No.: 93,161

[22] Filed: Nov. 13, 1979

[30] Foreign Application Priority Data

Dec. 8, 1978 [GB] United Kingdom ............... 47764/78

[51] Int. Cl.$^3$ ............................................. G02B 5/04
[52] U.S. Cl. .................................... 350/286; 356/241
[58] Field of Search ................... 350/286, 287, 319; 356/43–50, 241; 73/355; 415/118

[56] References Cited

U.S. PATENT DOCUMENTS

| | | | |
|---|---|---|---|
| 3,623,368 | 11/1971 | Decker, Jr. ........................ | 356/44 X |
| 4,011,017 | 3/1977 | Feuerstein et al. .................. | 356/241 |
| 4,078,864 | 3/1978 | Howell ............................ | 356/241 X |

*Primary Examiner*—F. L. Evans
*Attorney, Agent, or Firm*—Cushman, Darby & Cushman

[57] ABSTRACT

An optical probe is particularly for use as part of the viewing system of a radiation pyrometer, e.g. for measurement of temperatures of turbine blades in a gas turbine aeroengine. Although the objective end of the probe lies flush with the outer wall of the turbine gas passage in order to avoid disturbance of the gas flow and is angled away from the blade by virtue of its conformity with the geometry of the outer wall of the gas passage, the probe's field of view nevertheless includes locations on the turbine blades which are considerably axially upstream from the probe's position. This is achieved by providing the probe with an objective prism whose front and rear faces are inclined with respect to each other, so that, for rays of a preselected wavelength, the prism refracts into the probe and along the internal optical path of the probe only those rays from a preselected location on the blade. Since the blade radiates at a number of wavelengths, a filter is included in the viewing system so that the pyrometer is presented with radiation at a single wavelength, and therefore with a single image from the single preselected location on the blade. The probe also includes an image centralizing prism in order to centralize the optical path within the probe, and glare stops in order to collimate the rays after they have passed through the objective prism and the image centralizing prism. The objective prism may be made of sapphire in order to withstand the heat of the turbine gases.

10 Claims, 3 Drawing Figures

OPTICAL PROBE

The present invention relates to an optical probe for observing a location on an object within a fluid flow passage through a wall of the passage. The probe is adapted for use in cases where said location is offset from the optical probe's position in the passage. The invention is particularly, but not exclusively, for use as part of the viewing system of a radiation pyrometer such as would be used to measure the operating temperature of turbine blades in a gas turbine engine.

Techniques which allow pyrometric observation of turbine blades and other objects within the flow passages of gas turbine engines are already well established. One such technique, used to make pyrometric measurements of a row of turbine blades in an axial flow turbine, utilises an optical probe comprising a sight tube which obliquely enters the turbine casing and communicates with an aperture in the outer platform of a guide vane, being one of a ring of such guide vanes which immediately preceeds or succeeds the blade row. This sight tube affords a view of a preselected area of successive turbine blades as they pass the guide vane. In order to allow the pyrometer to view radiation coming from a small well-defined location within the preselected area on each succeeding blade, an appropriate field and depth of view of the radiation-sensitive element(s) in the pyrometer is selected by providing the pyrometer with an objective lens of appropriate power and aperture to focus the radiation from that location onto the element(s). In order to prevent hot combustion gases from entering the sight tube and thus contacting the lens, purging air or nitrogen is passed down the tube at a sufficient pressure to substantially prevent ingress of the gases. A transparent window can of course be provided to cover the end of the tube and thereby prevent the gases from entering. The window can be protected by providing means for ejecting air or nitrogen upstream of the window so that a thin layer of air or nitrogen flows continuously over the window whilst the engine is running. This prevents excessive heat stress and contamination of the window by the combustion gases.

If it is desired to observe upstream (forward)-facing portions of the blades, such as the leading edges, then a guide vane preceeding the blade row must be chosen as the viewing station. In this case the sight tube must enter the turbine casing at a position which is upstream of the guide vane ring and in a direction which has downstream (rearward) and radially directed components. If it is desired to observe downstream (rearward)-facing portions of the blades, such as the trailing edges, then a guide vane succeeding the blade row must be chosen as the viewing station. In this case the sight tube must enter the turbine casing at a position which is downstream of the guide vane ring and in a direction which has upstream (forward) and radially directed components. In either case, the sight tube must enter the turbine casing and the outer platform of the guide vane at an inconveniently shallow angle in order to provide the desired view of the blades. This makes the tube difficult and costly to install.

An alternative technique employs a periscope arrangement as an optical probe, thereby allowing insertion of the probe through the turbine casing at a convenient angle. Arrangements which involve protrusion of the end of the periscope into the flow passage are not desirable because of resultant disturbance of the gas flow in the passage and exposure of the end of the periscope to the full effects of the hot combustion gases; to avoid the need for protrusion into the passage, a periscope may be designed to "look" obliquely into the flow passage through an aperture in the outer platform of the guide vane. However, such an arrangement, in common with the sight tube arrangements discussed previously, has the disadvantage that the probe's field of view is undesirably limited and cannot readily be altered significantly because such alteration requires modification of engine structure.

According to the present invention, an optical probe for observing an object within a fluid flow passage through a wall of the passage has an objective element for directing rays from the object into an optical path within the probe thereby to observe, on the object within the flow passage, a location which is offset from said optical path as notionally extended from the probe into the flow passage, the objective element of the probe comprising objective prism means having plane front and rear faces, which faces are inclined with respect to each other so that when the probe is positioned correctly with respect to the wall of the flow passage, the front face of the prism means lies substantially flush with the internal wall surface of the flow passage so as not to significantly disturb the flow of fluid therepast, the included angle between said front and rear faces of the prism means being such that, for rays of a preselected wavelength, the prism means refracts into the probe and along said optical path substantially only those rays which approach said front face at a preselected angle of incidence which is related to the position within the flow passage of the location to be observed.

If the object to be observed radiates at a plurality of wavelengths, then the view transmitted along the probe's optical path by the objective prism means will consist of a corresponding plurality of superimposed spectral images, each image originating from a different location on the object. In this case, in order to observe only one location at any given time, it is necessary to pass the view through filter means adapted to filter out all wavelengths from the view except the wavelength, or narrow band of wavelengths, representing the desired location. Such filter means may be incorporated in the optical system of the probe itself, or the optical output of the probe may be passed through filter means before it is utilised.

Advantageously, the objective prism means comprises an objective prism for refracting rays into the probe and along the optical path, and a plane viewing window located in front of the objective prism to protect it from the effects of the fluid in the flow passage (this may be required, e.g. in cases where the fluid is a hot gas, such as in a gas turbine flow passage). The front surface of the viewing window is thus the front surface of the objective prism means and as such is substantially flush with the internal wall surface of the passage.

The optical probe may advantageously include a further prism in series with the objective prism means, the function of this further prism being to adjust the alignment of the optical path within the probe.

In a preferred embodiment, the front and rear faces of the further prism are substantially parallel to each other, but inclined with respect to the direction of the optical path within the probe.

Preferably, collimator means is incorporated in the optical probe in series with the objective prism means. The collimator means may comprise at least first and second apertures spaced apart from each other along the optical path within the probe. For example, the first aperture may be positioned between the objective prism and the further prism and the second aperture may be positioned after the further prism.

In a modification of the invention, the probe or an adjacent part of the wall of the flow passage is provided with means adapted to eject a film of air or other gas over the front face of the objective prism means, to protect it from contact with fluid in the flow passage.

The invention also includes a radiation pyrometer having a viewing system which includes an optical probe as described above. In situations where the radiation emitted by the object to be observed is at more than one wavelength and the wavelengths are significantly different, the viewing system incorporates wavelength filter means adapted to ensure that radiation passed to the pyrometer is substantially at only one wavelength and is therefore substantially from only the desired location on said object.

A particular use of the invention is for the observation of gas turbine engine components under operating conditions whilst they are within the engine; for example the observation of turbine blades within the turbine gas passage.

Under conditions in which the objective prism and/or viewing window is subject to high temperatures, a preferred material for the prism and/or window is sapphire.

Embodiments of the invention will now be described by way of example only with reference to the accompanying drawings, in which.

Figure 1:
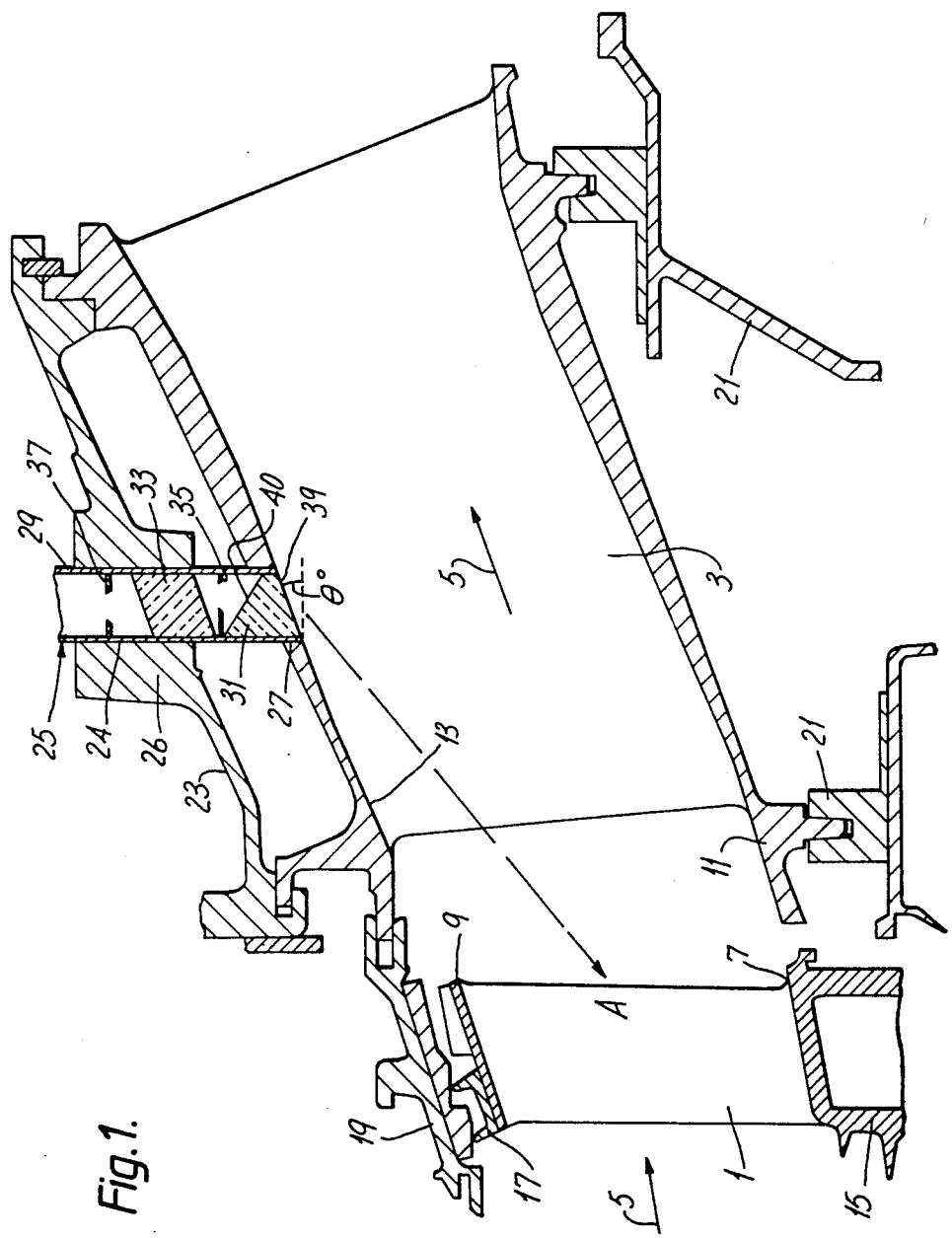
FIG. 1 shows a sectional elevation of part of a gas turbine engine fitted with an optical probe according to the invention.
Figure 2:
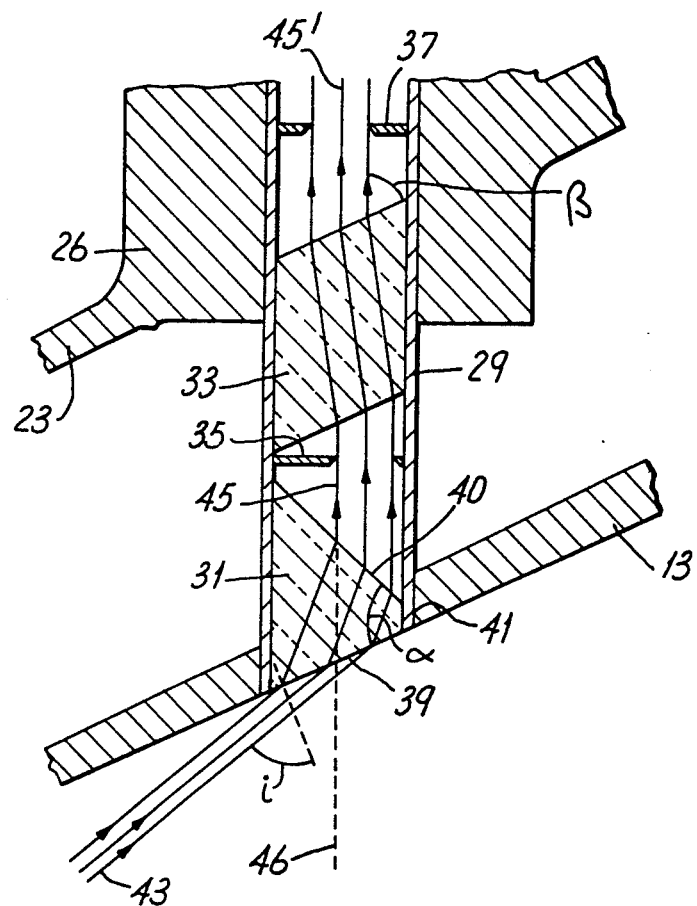
FIG. 2 is a view on a larger scale of part of FIG. 1 showing the optical probe more clearly.

Referring now to FIGS. 1 and 2, a gas turbine aeroengine includes in flow series a high pressure turbine blade row 1 and a guide vane ring 3 which acts as an inlet guide vane ring for a succeeding turbine blade row (not shown). Combustion gases flow from the combustion chamber (not shown) past blades 1 and vanes 3 in the direction of arrows 5 and are confined within a gas passage bounded by the flow surfaces of radially inner platforms 7 and outer shrouds 9 on blades 1, and radially inner platforms 11 and radially outer platforms 13 on vanes 3.

Blades 1 are mounted for rotation within the gas passage on a turbine disc (not shown) by means of blade root portions 15. The radially outer portions 17 of shrouds 9 seal against annular wall member 19 to prevent excessive leakage of the combustion gases past the radially outer sides of the shrouds 9. Vanes 3 are stationary, their radially inner platforms 11 being held by static structure 21 and their radially outer platforms 13 being held in turbine casing 23 and member 19.

The turbine blades 1 experience severe heating effects from the combustion gases and it is desirable to be able to monitor the temperatures of a location A on the trailing edge (rearmost) portions of the blade areofoils whilst the engine is running in order, for example, to be able to gauge the effectiveness of measures taken to reduce the running temperatures of the aerofoils.

Techniques for pyrometric measurement of the temperatures of portions of the aerofoils using sight tubes or periscopes are already well established as mentioned before, but are subject to certain difficulties, as also mentioned before.

In order to allow easier observation of the aerofoil trailing edges, the present invention provides an optical probe 25 which is specially adapted for insertion through a wall of the turbine gas passage. It passes through a standard intrascope inspection port 24 in boss 26 of turbine casing 23 and the objective end of probe 25 locates in an aperture 27 in the outer platform 13 of one of the guide vanes 3. The probe 25 comprises a probe body 29, an objective prism 31, an image centralising prism 33, and glare stops 35, 37 positioned between the two prisms 31, 33 and after prism 33 respectively.

Probe body 29 is in the form of a tube, and prisms 31 and 33 are cylindrical, being (within allowed tolerances) of the same diameter as the internal diameter of the probe body 29. Objective prism 31 is fixed in the end of probe body 29 and has front and rear faces 39 and 40 respectively which are mutually inclined so as to make an acute angle $\alpha$ with each other. The end of the probe, comprising the front face 39 of prism 31 and the surrounding part of the probe body 29 is chamfered to an angle $\theta°$ less than a right angle so that when the probe is correctly positioned, face 39 of prism 31 lies substantially flush with the flow surface of the outer platform 13 of guide vane 3. Thus, the probe does not significantly disturb the flow of combustion gases past its objective end.

The objective prism 31 in this embodiment is effectively of the triangular type. The actual cross-sectional shape is in fact quadrilateral, the fourth side at 41 (FIG. 2) being necessary in order that the downstream edge of the prism should have an appreciable thickness to enable it to resist the effects of the hot combustion gases. The geometry and refractive index of prism 31 are such that monochromatic rays 43 approaching face 39 at a preselected angle of incidence i are refracted into the probe body 29 and along its internal optical path 45 as shown. In this way it is possible to observe location A on the trailing edges of blades 1, even though they are an appreciable distance upstream of the aperture 27 and are considerably offset from the optical path 45 within the probe as notionally extended from the probe into the flow passage at 46.

In the present case, after the rays 43 have been refracted into the probe along optical path 45, they are off-centre with respect to the longitudinal axis of the probe body 29. In order to centralise them within the probe body 29, they are passed through a further cylindrical prism 33 whose front and rear faces are substantially parallel to each other and are inclined at an angle $\beta$ to the optical path 45/45' within the probe. Prism 33 thus refracts the rays to adjust their alignments as shown. After being adjusted to new internal optical path 45' by prism 33, the rays pass to further parts of the pyrometer optical system such as an objective lens or fibre optic unit (not shown).

Glare stops 35, 37 are aperture masks which are incorporated to cut down glare in the pyrometer viewing system caused by reflected radiation from the engine combustion chamber, from other hot parts of the blades and vanes, and from glowing particles and flames in the combustion gases. The glare stops act together as a form of collimator for the radiation entering the viewing system.

A suitable material from which the objective prism 31 can be made is sapphire, which has the necessary properties of heat and scratch resistance, and the required refractive index. However, in order to protect the objective prism from the effects of the combustion gases, the probe can be provided (FIG. 3) with an additional optical element in the form of a plane window (i.e. a thin cylindrical prism) 47 in front of the objective prism 31'. Window 47 may be made of sapphire, quartz, or other suitable material. Here, the front face 39' of the objective prism 31' is set back from the end of probe body 29' so that when the probe is positioned correctly, the face 39' is recessed with respect to the flow surface of radially outer platform 13 of the guide vane, the outer face 49 of window 47 being flush with the vane flow surface so as not to disturb the flow of the combustion gases.

An advantage realised by the provision of the window in front of the objective prism is that, should it be damaged or contaminated by the combustion gases, replacement of the plane window is cheaper than replacement of the bulkier and more expensive objective prism. Also, because the window is thinner than the prism, it will experience less thermally induced stress across its thickness than the prism.

The sapphire objective prism and/or window may be fixed in the end of the probe by a high temperature brazing technique.

An advantage of utilising sapphire as the material for the objective prism or window is that it can be allowed to reach a temperature so high that particulate matter or other contaminants from the combustion gases which stick to the front surface burn off, the front of the prism or window thus being largely self-cleaning.

Figure 3:
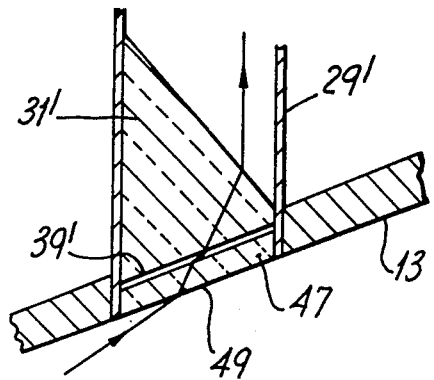
FIG. 3 is a view similar to FIG. 2 showing an alternative construction for the optical probe.

Because rays of differing wavelengths will be refracted by different amounts by the objective prism, the description given above with reference to FIGS. 1 to 3 assumes that the rays under consideration are monochromatic, i.e. are of one wavelength only. This assumption was made because rays approaching the front face of the objective prism at angles of incidence other than i (FIG. 2) will, provided they are of a suitably different wavelength from rays 43, also be refracted into optical path 45 by the objective prism. Because the differing angles of incidence represent differing radial locations on the blade, it will be appreciated that if the portion of aerofoil within the field of view of probe 25 is radiating at more than one wavelength, the probe presents the pyrometer with a view consisting of a number of superimposed spectral images, the number of images being theoretically the same as the number of wavelengths, but each image originating from a different radial location on the aerofoil.

Since measurements of aerofoil temperature made by the pyrometer should ideally be restricted to one preselected and well-defined location on the aerofoil (an area, say, of about 1 sq. mm), it is necessary in the first place to select only a small portion of the field of view of the optical probe for presentation to the radiation-sensitive element of the pyrometer. This is achieved by appropriate design of the other optical elements in the pyrometer viewing system, such as the strength and aperture of the objective lens to which the radiation is passed by the probe. If the radiation received by the probe comprises a number of significantly different wavelengths, this small portion of the field of view will in fact consist of the same number of superimposed spectral images, as described above, and therefore the pyrometer viewing system must also include a suitable filter so that only one wavelength, or a narrow band of wavelengths, representing one location on the blade, is passed to the radiation-sensitive element.

It will be seen from the above discussion that the configuration of the objective prism, i.e. the magnitude of the included angle $\alpha$ between front face 39 and rear face 40 (FIG. 2), is decided by reference to the following design criteria:

(a) the angle $\theta$ (FIG. 1);

(b) the desired radial position of location A on blade 1;

(c) the wavelength of radiation it is desired to monitor.

One advantage of the invention arises in that because of the character of the view presented to the pyrometer by the optical probe 25, the radiation-sensitive element of the pyrometer can be made to receive radiation from differing radial locations of the aerofoil within the bounds of that view by simply selecting the wavelength of the radiation which is passed to the element, i.e. changing the filter in the pyrometer viewing system.

Another advantage associated with the use of the invention is that large alterations in the field of view afforded to the pyrometer are possible without resort to structural modification of the engine. Thus, if it is desired to observe a number of locations on the aerofoil which are widely spaced along the aerofoil in the radial direction, a corresponding number of optical probes according to the invention may be utilised, each probe being adapted to view a particular one of the locations and differing from the others in the magnitude of the included angle between the front and rear faces of the objective prism.

It is contemplated that in order to further protect the objective prism 31 (FIG. 2) or the window 47 (FIG. 3) from the effects of contact with combustion gases, the upstream edge of the probe body 29, or a portion of the vane platform 13 immediately upstream of the probe body, could be provided with a means for ejecting a film of air or other gas such as nitrogen over the front face of the prism or window. This would act as an insulative and cooling measure and would also protect the prism or window from contamination. The film of gas would issue under pressure from a slot formed either in the surface of the platform 13 or, for example, defined between a double-walled portion of the probe body, the gas being passed down the body of the probe between the walls.

I claim:

1. An optical probe for observing an object within a fluid flow passage through a wall of said passage, said probe having an objective element for directing rays into an optical path within said probe thereby to observe, on said object, a location which is offset from said optical path as notionally extended from said probe into said flow passage, wherein said objective element of said probe comprises objective prism means whose front and rear faces are inclined with respect to each other so that when said probe is positioned correctly with respect to said wall of said passage, said front face of said prism means lies substantially flush with the internal wall surface of said passage, the included angle between said front and rear faces of said prism means being such that, for rays of a preselected wavelength, said prism means refracts into said probe and along said optical path substantially only those rays which approach said front face at a preselected angle of incidence, said preselected angle of incidence being related to the position within said flow passage of said location to be observed.

2. An optical probe as claimed in claim 1, in which the objective prism means comprises an objective prism for refracting rays into the probe and along the optical path, and a plane viewing window located in front of said objective prism, the front surface of said window being substantially flush with the internal wall surface of the passage.

3. An optical probe as claimed in claim 1 or claim 2, having a further prism in series with the objective prism means, said further prism being adapted to adjust the alignment of the optical path within said probe.

4. An optical probe as claimed in claim 3 in which the front and rear faces of the further prism are substantially parallel to each other but inclined with respect to the direction of the optical path within said probe.

5. An optical probe as claimed in claim 1 having collimator means in series with the objective prism means.

6. An optical probe as claimed in claim 5 in which the collimator means comprises at least first and second apertures spaced apart from each other along the optical path within said probe.

7. An optical probe as claimed in claim 1 incorporating filter means adapted to allow only rays of substantially the preselected wavelength to be outputted from said probe.

8. An optical probe as claimed in claim 1 provided with means adapted to eject a film of air or other gas over the front face of the objective prism means to protect said objective prism means from contact with fluid in the flow passage.

9. An optical probe as claimed in claim 1 in which at least the front face of the objective prism means is composed of sapphire.

10. A radiation pyrometer having a viewing system which includes an optical probe as claimed in claim 1.

* * * * *